(12) United States Patent
Adkins, Jr.

(10) Patent No.: US 9,988,086 B1
(45) Date of Patent: Jun. 5, 2018

(54) VEHICLE SUB-FRAME STRUCTURE AND TRUCK INCORPORATING SAME

(71) Applicant: Eddie Adkins, Jr., Charlotte, NC (US)

(72) Inventor: Eddie Adkins, Jr., Charlotte, NC (US)

(*) Notice: Subject to any disclaimer, the term of this patent is extended or adjusted under 35 U.S.C. 154(b) by 108 days.

(21) Appl. No.: 15/340,305

(22) Filed: Nov. 1, 2016

(51) Int. Cl.
| | |
|---|---|
| B62D 21/08 | (2006.01) |
| B62D 21/03 | (2006.01) |
| B62D 21/09 | (2006.01) |
| B62D 25/20 | (2006.01) |
| B62D 33/02 | (2006.01) |
| B61D 3/08 | (2006.01) |

(52) U.S. Cl.
CPC ............ *B62D 21/08* (2013.01); *B62D 21/03* (2013.01); *B62D 21/09* (2013.01); *B62D 25/2054* (2013.01); *B60Y 2200/40* (2013.01); *B60Y 2410/124* (2013.01); *B61D 3/08* (2013.01); *B62D 33/02* (2013.01)

(58) Field of Classification Search
CPC ........ B62D 21/08; B62D 21/09; B62D 21/03; B62D 25/2054; B62D 33/02; B61D 3/08
USPC ............ 296/184.1, 193.07, 204, 183.1
See application file for complete search history.

(56) References Cited

U.S. PATENT DOCUMENTS

| | | | | |
|---|---|---|---|---|
| 2,478,578 A | * | 8/1949 | Gottshall | B62D 33/02 410/81 |
| 2,540,400 A | * | 2/1951 | McHenry | B62D 25/2054 296/184.1 |
| 3,101,819 A | * | 8/1963 | Shinn | B62D 53/065 280/789 |
| 4,276,985 A | | 7/1981 | Newman | |
| 6,099,070 A | | 8/2000 | Yocum | |
| 6,120,235 A | | 9/2000 | Humphries et al. | |
| 7,717,662 B2 | | 5/2010 | Alexander | |
| 2015/0001894 A1 | * | 1/2015 | Outen | B62D 21/02 296/204 |
| 2015/0137558 A1 | * | 5/2015 | Ayuzawa | B62D 25/2036 296/193.07 |
| 2015/0353138 A1 | * | 12/2015 | Fenton | B62D 25/02 296/186.1 |
| 2016/0229455 A1 | * | 8/2016 | Isaksson | B62D 21/02 |

* cited by examiner

*Primary Examiner* — Jason S Morrow
(74) *Attorney, Agent, or Firm* — Nelson Mullins Riley & Scarborough LLP

(57) ABSTRACT

A vehicle sub-frame structure for affixation to a vehicle frame as a support platform for a vehicle body comprises a frame skeleton of interconnected longitudinal and transverse frame members defining internal frame cavities therebetween. Top and bottom outward panels are connected to upper and lower sides of the frame skeleton enclosing the internal frame cavities. A plurality of bracing members are rigidly affixed within each internal frame cavity extending longitudinally and transversely between the frame members and vertically between the top and bottom outward panels to resist deformation of the frame members and the outward panels under forces and loads applied to the sub-frame structure. The bracing members include a plurality of mirror image V-shaped brace panels which form an X-shaped configuration between opposing corners within each frame cavity.

18 Claims, 4 Drawing Sheets

VEHICLE SUB-FRAME STRUCTURE AND TRUCK INCORPORATING SAME

FIELD OF THE INVENTION

The present invention relates generally to trucks, particularly utility trucks, and more specifically to sub-frame structures affixed to the frames of such trucks as a support platform for mounting of a vehicle body onto the sub-frame structure.

BACKGROUND OF THE INVENTION

Commercial trucks are commonly manufactured and sold with only a vehicle cab mounted on the necessary running gear, but with no other body structure mounted on the vehicle frame rails so that such trucks may be custom outfitted with whatever bodies and work apparatus as may be needed or desirable to suit a particular utility or work purpose. For example, such trucks may be equipped with specially designed and configured cargo beds, storage cabinetry, associated power equipment such as air and hydraulic compressors, pumps, lift cranes, outrigger structures for stabilizing the truck body when situated at a job site, etc.

Third party manufacturers who purchase basic trucks from major vehicle manufacturers must design and retrofit to the truck frame appropriate sub-frame structures to support such specialty equipment. Competing considerations often must be accommodated in the design of the necessary support structures. For example, in trucks to be equipped with cranes or like lifting mechanisms, the sub-frame structures must be of sufficient strength and rigidity to withstand the forces and loads imposed during lifting operations. While sub-frame structures can be constructed of larger, heavier, thicker materials, or otherwise reinforced to carry such loads and forces, each basic truck comes from the manufacturer with a rating of the maximum load capacity that can be accommodated by the vehicle suspension. Reinforcement of sub-frame support structures typically adds significant extra weight on the vehicle suspension which in turn limits the utility of the vehicle without exceeding the manufacturer's load capacity rating. Thus, there is generally a practical limit to how much a truck sub-frame structure can be reinforced without detracting from the intended utility of the vehicle. On the other hand, insufficient reinforcement of a sub-frame structure poses the risk of damage to the sub-frame structure or even failure of the truck under load, or in extreme cases potential injury to workmen.

There therefore exists a significant but yet unmet need in the utility truck industry for a design for a vehicle sub-frame structure that provides significant reinforced strength to the structure but with minimal added weight.

SUMMARY OF THE INVENTION

Briefly summarized, one aspect of the present invention provides a vehicle sub-frame structure adapted for affixation to a vehicle frame as a support platform for mounting of a vehicle body onto the sub-frame structure. According to the present invention, the sub-frame structure comprises a frame skeleton having a plurality of longitudinal and transverse frame members rigidly interconnected with to one another in spaced-apart relationship for defining a plurality of internal frame cavities therebetween. A top outward panel and a bottom outward panel are connected respectively to upper and lower sides of the longitudinal and transverse frame members thereby enclosing the internal frame cavities therebetween. Each frame cavity has respective upper and lower corners along the upper and lower sides of each longitudinal and transverse frame member. A plurality of bracing members are rigidly affixed within each internal frame cavity to extend longitudinally and transversely between the longitudinal and transverse frame members and to extend vertically between the top and bottom outward panels for supporting the longitudinal and transverse frame members and the top and bottom outward panels against deformation under forces and loads applied to the sub-frame structure. In particular, the bracing members include a plurality of brace panels which extend angularly relative to one another and to the longitudinal and transverse frame members in an X-shaped configuration between opposing corners within each frame cavity.

In a contemplated embodiment of the invention, the longitudinal frame members and the bottom outward panel may be integrally formed from a unitary sheet of metal. The brace panels within each frame cavity may comprise a pair of V-shaped panels arranged in mirror-image relation within the frame cavity. More particularly, each V-shaped panel comprises laterally outward end edges and a central vertex edge intermediately therebetween, with each pair of V-shaped panels being arranged with their respective vertex edges affixed rigidly together and their respective end edges affixed rigidly to the frame skeleton at respective corners of the frame cavity. Each V-shaped panel further comprises laterally outward side edges extending between the end edges, with each pair of V-shaped panels being affixed at their respective end edges to opposing longitudinal frame members at respective longitudinal corners of the respective frame cavity and being affixed at their respective side edges to opposing transverse frame members.

The sub-frame structure may include additional bracing members that supplement the V-shaped brace panels. For example, a plurality of support beams extending between the brace panels and the top and bottom outward panels may be provided as additional bracing members. More particularly, one longitudinal support beam may be affixed rigidly within each frame cavity between the vertex edge of one of the V-shaped panels, e.g., the bottom facing V-shaped panel, and the adjacent outward panel, e.g., the bottom outward panel, and between opposing transverse frame members. Two additional longitudinal support beams may be affixed rigidly within each frame cavity between the other V-shaped panel, e.g., the top-facing V-shaped panel, and the other outward panel, e.g., the top outward panel, at locations on opposite sides of the vertex edge and between opposing transverse frame members.

Another aspect of the invention provides a truck which basically comprises a suspension system, a frame mounted on the suspension system, a sub-frame structure as aforedescribed mounted on the frame, and a truck body supported on the sub-frame structure.

DETAILED DESCRIPTION OF THE INVENTION

Figure 1:
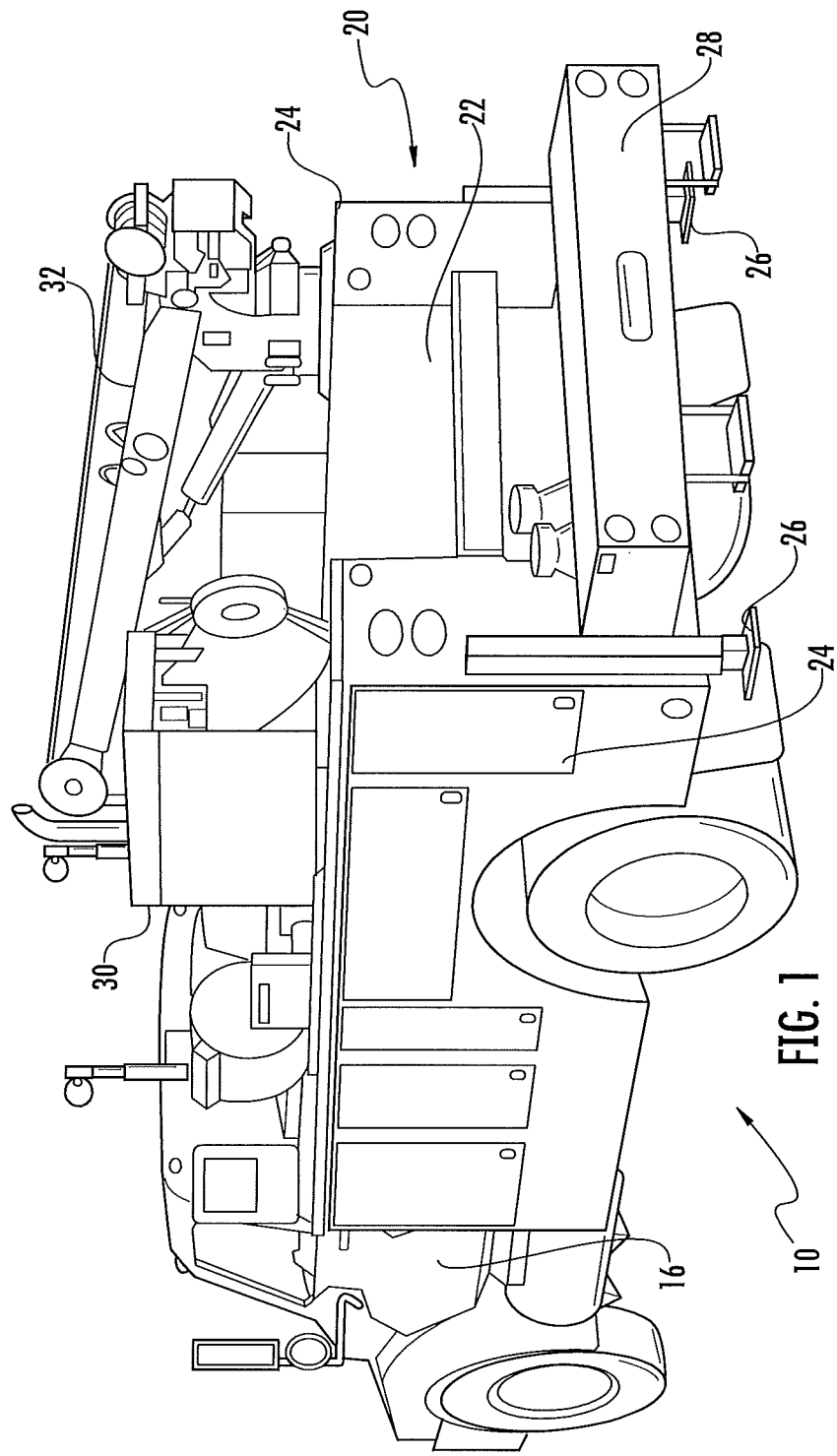
FIG. 1 is a perspective view of a representative utility truck equipped with a sub-frame structure according to a contemplated embodiment of the present invention.
Figure 2:
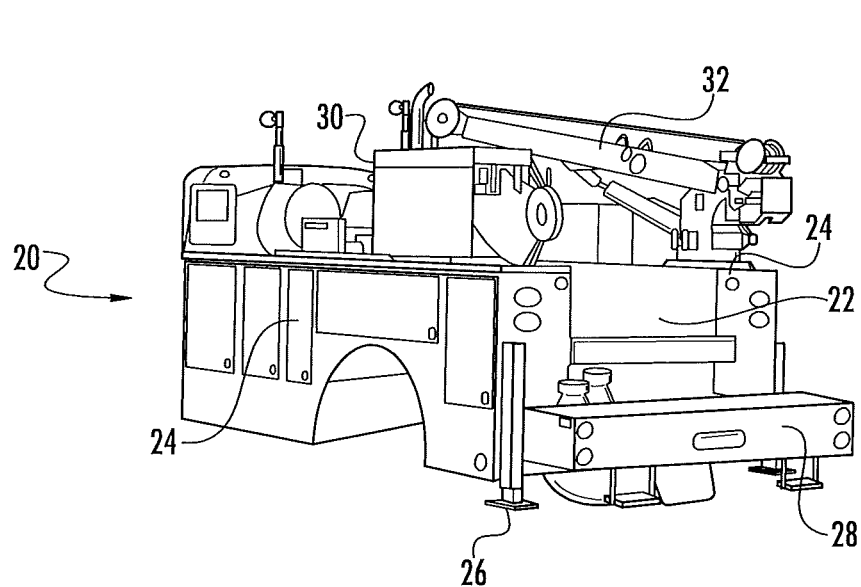
FIG. 2 is a partially exploded perspective view of the utility truck of FIG. 1.
Figure 2:
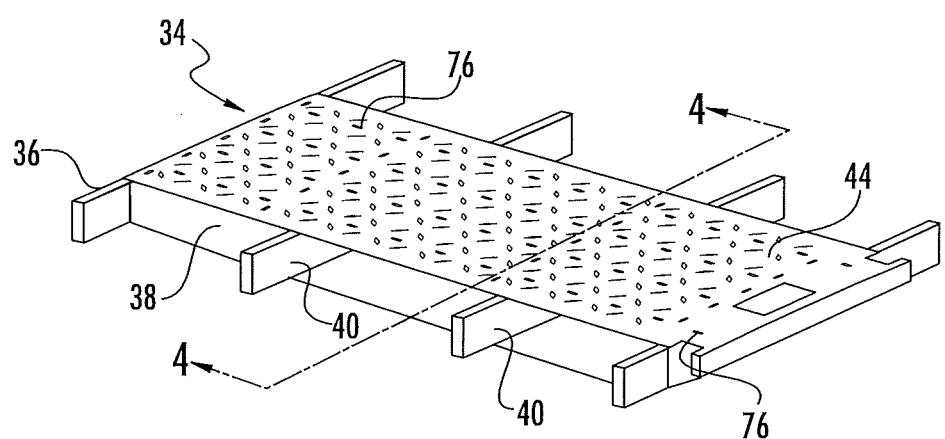
Figure 2:
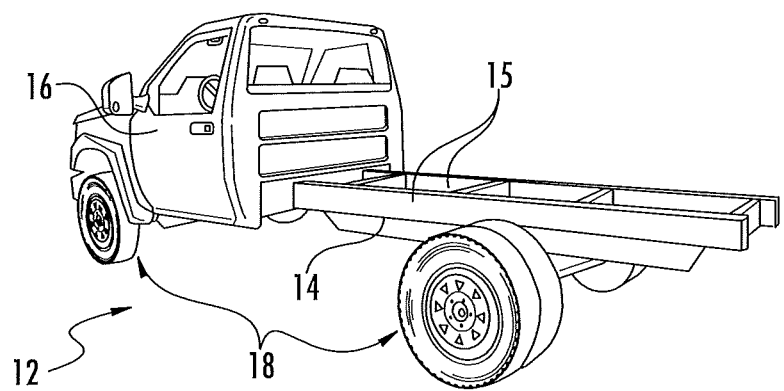

Referring now to the accompanying drawings and initially to FIGS. 1 and 2, a representative form of utility truck of the type to which the sub-frame structure of the present invention is particularly adapted is depicted overall at 10. For purposes of the present disclosure, the term "utility truck" is used in its broadest sense to encompass any and all commercial duty trucks outfitted with various bodies and work apparatus (e.g., cargo beds, storage cabinetry, associated power equipment, etc.) suited to a particular utility or work purpose, but not specific nor limited to any particular industry or work application. Thus, it is to be expressly understood that the truck 10 of FIGS. 1 and 2 is only exemplary for purposes of depicting and describing a representative embodiment of the sub-frame structure of the present invention, and in particular it is to be understood that the sub-frame structure is not limited in application to the depicted truck 10.

The utility truck 10 basically comprises a bare truck structure 12, shown in FIG. 2, of the type commercially available from various truck manufacturers and basically comprising a truck frame 14 supporting a driver cab/compartment 16, and necessary running gear, i.e., engine, transmission, and differential (not specifically illustrated), all supported on a suspension system, only generally indicated at 18, with the frame rails 15 of the truck frame 14 rearward of the cab 16 exposed and unadorned for purposes of mounting thereon of whatever body structures and work apparatus as may be desired by the end user. For example but without limitation, as depicted in the truck of FIGS. 1 and 2, a body structure 20 mounted on the bare truck structure 12 comprises, among other things, a central longitudinally-extending cargo bed 22 with a series of enclosed cabinet structures 24 flanking opposite sides of the cargo bed 22, stabilizing outriggers 26 supported at the rearward corners of the body structure 20, a rear work platform 28, a compressor apparatus 30 mounted to the top of one cabinet structure 24, and a hydraulic crane 32 mounted to the top of the opposite cabinet structure 24. To facilitate the mounting of the body structure 20, a sub-frame structure 34 is custom-designed to mount on the exposed frame rails 15 of the truck frame 14 to support the specific body structure 20.

Generally speaking, the configuration, features and equipment of the body structure 20, and the attendant design of the necessary sub-frame structure 34, are limited mainly by the manufacturer's load rating for the suspension system with which the bare truck structure 12 is equipped. In turn, the design and capability of the sub-frame structure 34 must impart sufficient rigidity and strength to withstand forces and loads placed upon the sub-frame structure 34 during anticipated operations of the equipment fitted onto the body structure 20. For example but in particular in utility trucks such as the truck 10 having a body structure 20 equipped with a lifting crane 32, the weight of items typically to be lifted by the crane 32 and the movements the crane 32 would typically execute during lifting operations will place loads and forces on the sub-frame structure 34 of various types and in various directions, thereby necessitating that the sub-frame structure 34 be of substantially greater strength and rigidity than would be necessary for a comparable body structure 20 without a lifting crane 34. However, while it is of course possible to reinforce the rigidity and strength of the sub-frame structure by utilizing additional reinforcing components and heavier gauge materials, these types of reinforcing and strengthening components add substantially to the weight of the sub-frame structure 34 and, in turn, reduce the usable capacity of the truck within the limits of the manufacturer's rated load capacity for the truck suspension.

Figure 3:
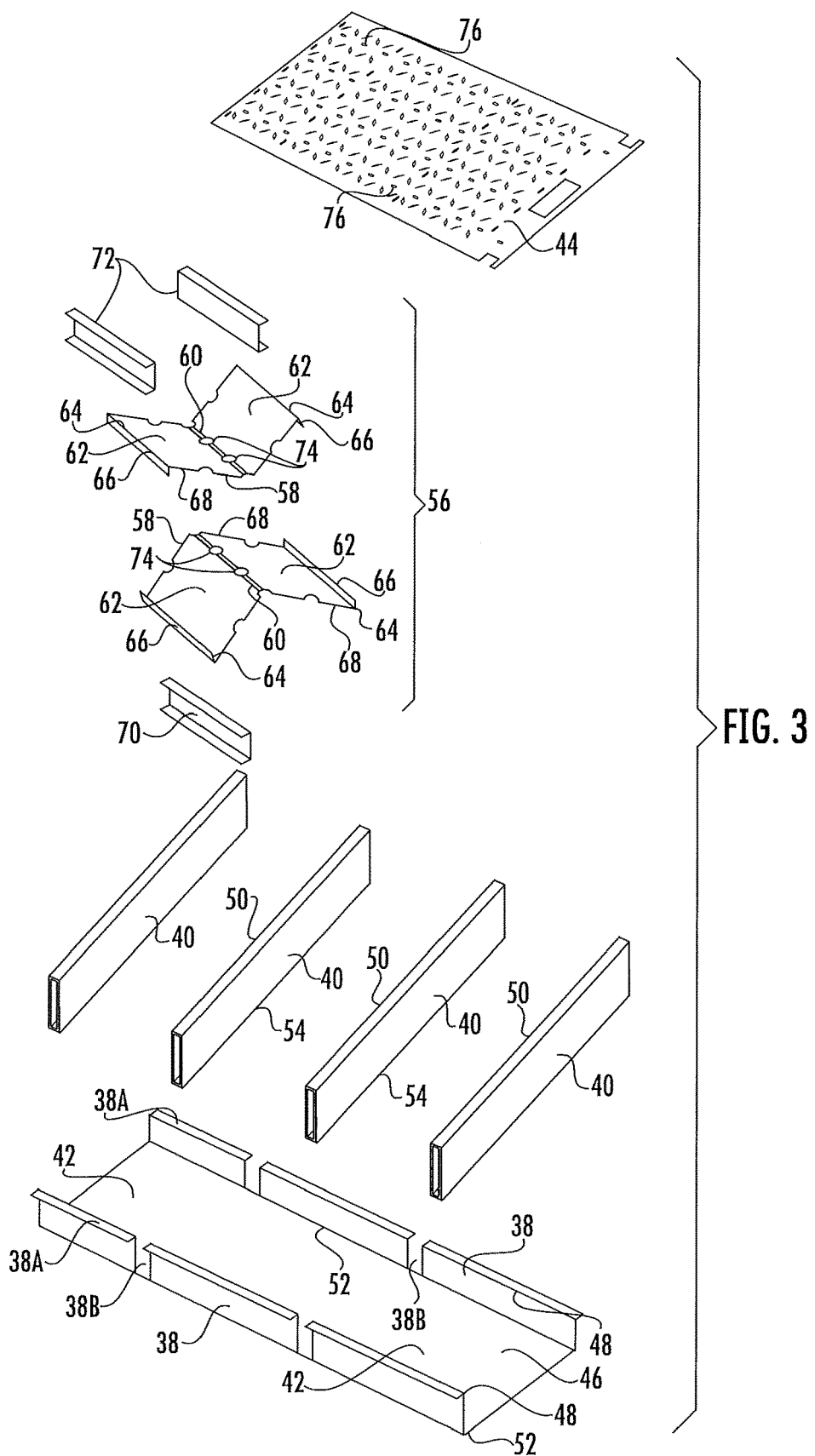
FIG. 3 is an exploded perspective view of the sub-frame structure of the utility truck of FIGS. 1 and 2.
Figure 4:
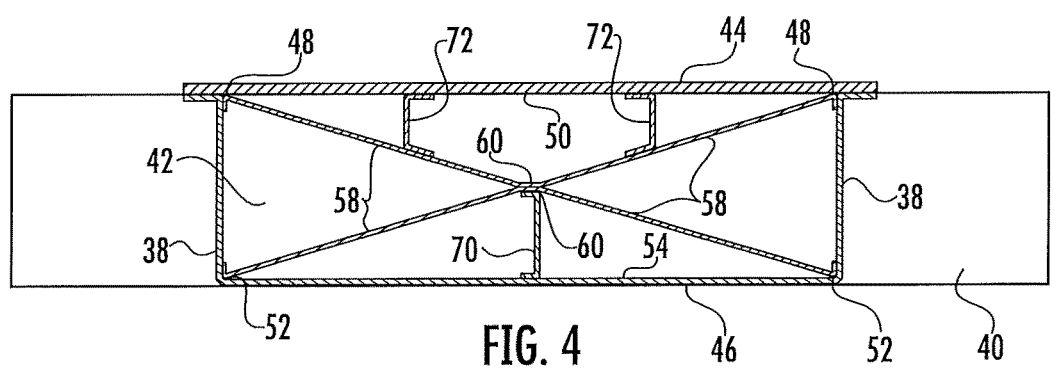
FIG. 4 is a cross-sectional view of the sub-frame structure of FIG. 2 taken along line 4-4 thereof.

The present invention overcomes this problem by providing a unique sub-frame structure of significantly lighter weight yet greater strength and rigidity than conventional sub-frame structures. With reference to FIGS. 3 and 4, the sub-frame structure 34 of the present invention basically comprises a frame skeleton 36 formed of a plurality of longitudinal and transverse frame members 38, 40 interconnected with one another in spaced-apart relationship thereby defining a plurality of internal frame cavities 42 therebetween. A top outward panel 44 and a bottom outward panel 46 are connected respectively to upper and lower sides of the longitudinal and transverse frame members 38, 40 and thereby enclose the internal frame cavities 42 therebetween with each frame cavity having respective upper and lower corners 48, 50, 52, 54 along the upper and lower sides of each longitudinal and transverse frame member 38, 40. According to the present invention, a plurality of bracing members, indicated generally at 56 and described more fully in detail hereinafter, are rigidly affixed within each internal frame cavity 42 to extend longitudinally and transversely between the longitudinal and transverse frame members 38, 40 and to extend vertically between the top and bottom outward panels 44, 46. In this manner, the bracing members 56 support the longitudinal and transverse frame members 38, 40 and the top and bottom outward panels 44, 46 against deformation under forces and loads applied to the sub-frame structure 34.

As best seen in FIG. 3, in the contemplated embodiment illustrated in the drawings, the longitudinal frame members 38 and the bottom outward panel 46 are formed integrally from a single rectangular sheet of metal bent longitudinally along parallel spaced-apart lines to define the bottom outward panel 46 between the lengthwise bend lines and with the longitudinal frame members 38 upstanding from the bend lines. The upper ends of the longitudinal frame members 38 are bent horizontally to form outward flanges 38A. The transverse frame members 40 may preferably be formed as beams of rectangular tubular metal, as also shown in FIG. 3. Each of the longitudinal frame members 38 are formed with opposing cutouts 38B at spacings along their lengthwise extents to receive the transverse frame members 40. A forwardmost one of the transverse frame members 40 is rigidly affixed, preferably by welding, to the forward edges of the longitudinal frame members 38 and the bottom outward panel 46 and, similarly, a rearwardmost one of the transverse frame members 40 is welded or otherwise rigidly affixed to the rearward edges of the longitudinal frame members 38 and the bottom outward panel 46. Additional transverse frame members 40 are welded or otherwise rigidly affixed along their forward and rearward bottom edges to the bottom outward panel 46 and are likewise affixed along their upstanding forward and rearward sides to the abutting edges of the longitudinal frame members 38 within the cutouts 38B. In the depicted embodiment, the transverse frame members 40 are of a length greater than the transverse dimension between the longitudinal frame members 38, to extend laterally outwardly therefrom.

The same arrangement of bracing members 56 is affixed within each cavity 42. As depicted in FIG. 3, each set of bracing members 56 comprises a pair of V-shaped brace panels 58 arranged in mirror-image relation to one another within the respective frame cavity 42 forming an X-shaped configuration which extends angularly relative to one another and to the longitudinal and transverse frame members 38, 40 laterally between the opposing longitudinal corners 48, 52 and longitudinally between the adjacent transverse frame members 40. More specifically, each V-shaped panel 58 may preferably be formed integrally from a single rectangular sheet of metal bent longitudinally at a transverse mid-point to form a flattened central vertex edge 60 from which angled panel sections 62 extend oppositely outwardly and terminate at laterally outward end edges 64 which are reversely bent to form lengthwise flanges 66. The pair of V-shaped panels are arranged with their respective vertex edges 60 affixed together, e.g., by welding, in abutment with each other, and their respective end edges 64 are welded or otherwise rigidly affixed by their flanges 66 to the opposing longitudinal frame members 38 at the respective upper and lower longitudinal corners 48, 52 of the frame cavity 42. The laterally outward side edges 68 at the forward and rearward sides of each V-shaped panel 58 are welded or otherwise affixed to the opposing transverse frame members 40. In this manner, each V-shaped panel 58 spans the full longitudinal and transverse extent of each cavity 42 within the frame skeleton 36.

Each set of bracing members 56 within each cavity 42 may additionally comprise several support beams 70, 72 providing supplementary support between the V-shaped brace panels 58 and the top and bottom outward panels 44, 46. As shown in FIGS. 3 and 4, a single vertical support beam 70 is disposed longitudinally within each frame cavity 42 between the vertex edge 60 of the lowermost one of the V-shaped panels 58 and the adjacent bottom outward panel 46. The upper side of the beam 70 is welded or otherwise rigidly affixed to the vertex edge 60 of the lower V-shaped panel 58, the lower side of the beam 70 is welded or otherwise affixed to the bottom outward panel 46, and the opposite forward and rearward ends of the beam 70 are welded or otherwise affixed to the opposing transverse frame members 40. Similarly, a pair of support beams 72 are disposed longitudinally within each frame cavity 42 between the uppermost one of the V-shaped panels 58 and the adjacent top outward panel 44. The support beams 72 are situated in vertical disposition at opposite laterally outward spacings from the vertex edge 60 of the upper V-shaped panel 58, at which the lower side of each beam 72 is welded or otherwise rigidly affixed to the upper surface of the V-shaped panel 58 and the upper side of each beam 72 is welded or otherwise rigidly affixed to the top outward panel 44.

As will be appreciated, many variations of the above-described features of the sub-frame structure 34 are possible within the scope of the invention. For example, while the bottom outward panel 46 and the longitudinal frame members 38 are depicted and described as preferably formed of a single sheet of metal, persons of ordinary skill in the art will readily recognize and understand that the bottom outward panel 46 and the longitudinal frame members 38 could be separate components welded or otherwise rigidly affixed together. Similarly, while each V-shaped panel 58 in the contemplated embodiment is depicted and described as preferably formed of a single metal sheet, it will be understood that the vertex edge 60 and panel sections 62 of each V-shaped panel 58 could be made as discrete metal components welded or otherwise affixed together. While all of the V-shaped panels 58 are shown in the depicted embodiment as extending angularly in the transverse direction relative to the longitudinal dimension of the sub-frame structure 34, the V-shaped panels 58 could alternatively be disposed to extend angularly in the longitudinal direction within each cavity 42 or, as a further alternative, the V-shaped panels 58 could be disposed in alternating dispositions from one cavity 42 to the next. Likewise, while each support beam 70, 72 is preferably of a generally C-shape formed of a single metal sheet bent at each longitudinal edge to form upper and lower flanges, persons skilled in the art will readily recognize and understand that other shapes and configurations are possible, e.g., a rectangular tubular beam, a V-shape, etc. Further, although in the contemplated embodiment the single beam 70 is disposed beneath the lower V-shaped panel 58 and the spaced-apart beams 72 are disposed above the upper V-shaped panel 58, the disposition of the beams 70, 72 could be reversed. These and other variations are considered to be within the scope of the present invention.

To facilitate assemblage of the various bracing members 56, the V-shaped brace panels 58 may preferably be formed with openings 74 to facilitate the execution of welds to rigidly join the bracing members 56 together. For example, as depicted in FIGS. 3 and 4, the vertex edges 60 of the V-shaped panels 58 have two or more circular openings 74 at asymmetrical offsets. Thus, all of the V-shaped panels 58 may be identically fabricated, but when arranged in mirror-image relationship, the circular openings 74 do not align with each other. In fabricating the sub-frame structure 34, the transverse frame members 40 are initially welded to the sheet-metal unit forming the longitudinal frame members 38 and the bottom outward panel 46. The lower support beam 70 is then welded within each cavity 42 to the bottom outward panel 46. The lower V-shaped panel 58 is then situated within the cavity 42 in inverted disposition over the lower support beam 70 and welded into place, specifically by welding its end flanges 66 and side edges 68 to the longitudinal and transverse frame members 38, 40 and welding its vertex edge 60 through the openings 74 to the upper side of the beam 70. The upper V-shaped panel 58 is then situated within the cavity 42 over the lower V-shaped panel 58 and welded in place, specifically by welding its end flanges 66 and side edges 68 to the longitudinal and transverse frame members 38, 40 and welding its vertex edge 60 through the openings 74 to the vertex edge 60 of the lower V-shaped panel 58.

Similarly, to facilitate assemblage of the top outward panel 44 onto the assembled skeleton frame 36 and the bracing members 56, the top outward panel 44 is formed with a plurality of slots 76 at strategically selected positions spaced about the top outward panel 44 coinciding with upper surfaces of the longitudinal and transverse frame members 38, 40 and the bracing members 56. Thus, when the top outward panel 44 is placed onto the skeleton frame 36 following installation of the bracing members 56, plug welds may be formed in the various slots 76 to rigidly secure the top outward panel 44 in place integrally with the remainder of the sub-frame structure 34. The top outward panel 44 forms the floor surface of the cargo bed 22 of the truck 10. Accordingly, the top outward panel 44 may be formed of a thicker gauge stainless steel than other components of the sub-frame structure 34, and may also be formed with a so-called diamond-plate dimpled surface pattern to provide a functional and aesthetic texture to the cargo bed.

Upon complete fabrication of the sub-frame structure 34, the entirely assembled structure is mounted onto the frame rails 15 of the truck frame 14 and secured in place by any suitable means, e.g., by bolts, other fasteners, securing brackets, welding, or a combination of such means of securement. The manner in which sub-frame structures may be affixed to a truck frame are known and do not form a part of the present invention. The laterally outwardly extending ends of the transverse frame members 40 allow for mounting thereon of the cabinet structures 24 at opposite sides of the cargo bed 22 formed by the top outward panel 44.

The function and advantages of the sub-frame structure 34 of the present invention may thus be understood and appreciated. The arrangement of bracing members 56 within each cavity 42 uniquely serves to brace the frame skeleton 36 in all directions, longitudinally, transversely, vertically, horizontally and in other directions angularly thereto. When forces are imposed on the sub-frame structure 34 during operations of the truck 10, particularly for example when the crane 32 executes lifting movements and rotational movements while supporting a lifted load, forces imposed on the sub-frame structure 34 in various vector directions are opposed by the arrangement of bracing members 56 and serve to prevent deformation and failure of the various components of the sub-frame structure 34. As a result, various of the components of the sub-frame structure 34 may be fabricated of lower-gauge, lighter-weight materials than would be thought to be desirable or even feasible by conventional wisdom. For example, in the sub-frame structure as depicted, it is contemplated that all of the sheet metal components from which the longitudinal frame members 38, the bottom outward panel 46, and the various bracing members 56 may be fabricated of relatively thinner and lighter weight 11 gauge stainless steel sheet metal than would conventionally be utilized for a vehicle sub-frame structure, yet the integrated structure of the components of the sub-frame structure 34 is contemplated to render the sub-frame structure 34 capable of withstanding substantial loads and forces, in particular loads that may substantially exceed the rated lifting capacity of the crane 32, e.g., by 30% or more of its full rated capacity.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

What is claimed is:

1. A vehicle sub-frame structure for affixation to a vehicle frame as a support platform for mounting of a vehicle body onto the sub-frame structure, the sub-frame structure comprising:
    a. a frame skeleton comprised of a plurality of longitudinal and transverse frame members interconnected with one another in spaced-apart relationship defining a plurality of internal frame cavities therebetween,
    b. a top outward panel and a bottom outward panel connected respectively to upper and lower sides of the longitudinal and transverse frame members and enclosing the internal frame cavities therebetween,
    c. each frame cavity having respective upper and lower corners along the upper and lower sides of each longitudinal and transverse frame member,
    d. a plurality of bracing members rigidly affixed within each internal frame cavity to extend longitudinally and transversely between the longitudinal and transverse frame members and to extend vertically between the top and bottom outward panels for supporting the longitudinal and transverse frame members and the top and bottom outward panels against deformation under forces and loads applied to the sub-frame structure,
        i. the bracing members including a plurality of brace panels extending angularly relative to one another and to the longitudinal and transverse frame members in an X-shaped configuration between opposing corners within each frame cavity.

2. A vehicle sub-frame structure according to claim 1, wherein the brace panels within each frame cavity comprise a pair of V-shaped panels arranged in mirror-image relation within the frame cavity.

3. A vehicle sub-frame structure according to claim 2, wherein each V-shaped panel comprises laterally outward end edges and a central vertex edge intermediately therebetween, each pair of V-shaped panels being arranged with their respective vertex edges affixed rigidly together and their respective end edges affixed rigidly to the frame skeleton at respective corners of the frame cavity.

4. A vehicle sub-frame structure according to claim 3, wherein each V-shaped panel further comprises laterally outward side edges extending between the end edges, each pair of V-shaped panels being affixed at their respective end edges to opposing longitudinal frame members at respective longitudinal corners of the respective frame cavity and being affixed at their respective side edges to opposing transverse frame members.

5. A vehicle sub-frame structure according to claim 4, wherein the bracing members further comprise a first longitudinal support beam affixed rigidly within each frame cavity between the vertex edge of one of the V-shaped panels and the adjacent one of the outward panels and between opposing transverse frame members.

6. A vehicle sub-frame structure according to claim 5, wherein the bracing members further comprise second and third longitudinal support beams affixed rigidly within each frame cavity between the other of the V-shaped panels and the adjacent one of the outward panels at locations on opposite sides of the vertex edge and between opposing transverse frame members.

7. A vehicle sub-frame structure according to claim 6, wherein the first longitudinal support beam is affixed between a bottom one of the V-shaped panels and the bottom outward panel, and the second and third longitudinal support beams are affixed between a top one of the V-shaped panels and the top outward panel.

8. A vehicle sub-frame structure according to claim 1, wherein the bracing members further comprise a plurality of support beams extending between the brace panels and the top and bottom outward panels.

9. A vehicle sub-frame structure according to claim 1, wherein the longitudinal frame members and the bottom outward panel are integrally formed from a unitary sheet of metal.

10. A truck comprising a suspension system, a frame mounted on the suspension system, a sub-frame structure mounted on the frame, and a truck body supported on the sub-frame structure, wherein the sub-frame structure comprises:

a. a sub-frame skeleton comprised of a plurality of longitudinal and transverse frame members interconnected with one another in spaced-apart relationship defining a plurality of internal frame cavities therebetween, b. a top outward panel and a bottom outward panel connected respectively to upper and lower sides of the longitudinal and transverse frame members and enclosing the internal frame cavities therebetween, c. each frame cavity having respective upper and lower corners along the upper and lower sides of each longitudinal and transverse frame member, d. a plurality of bracing members rigidly affixed within each internal frame cavity to extend longitudinally and transversely between the longitudinal and transverse frame members and to extend vertically between the top and bottom outward panels for supporting the longitudinal and transverse frame members and the top and bottom outward panels against deformation under forces and loads applied to the sub-frame structure, the bracing members including i. a plurality of brace panels extending angularly relative to one another and to the longitudinal and transverse frame members in an X-shaped configuration between opposing corners within each frame cavity.

11. A truck according to claim 10, wherein the brace panels within each frame cavity comprise a pair of V-shaped panels arranged in mirror-image relation within the frame cavity.

12. A truck according to claim 11, wherein each V-shaped panel comprises laterally outward end edges and a central vertex edge intermediately therebetween, each pair of V-shaped panels being arranged with their respective vertex edges affixed rigidly together and their respective end edges affixed rigidly to the frame skeleton at respective corners of the frame cavity.

13. A truck according to claim 12, wherein each V-shaped panel further comprises laterally outward side edges extending between the end edges, each pair of V-shaped panels being affixed at their respective end edges to opposing longitudinal frame members at respective longitudinal corners of the respective frame cavity and being affixed at their respective side edges to opposing transverse frame members.

14. A truck according to claim 13, wherein the bracing members further comprise a first longitudinal support beam affixed rigidly within each frame cavity between the vertex edge of one of the V-shaped panels and the adjacent one of the outward panels and between opposing transverse frame members.

15. A truck according to claim 14, wherein the bracing members further comprise second and third longitudinal support beams affixed rigidly within each frame cavity between the other of the V-shaped panels and the adjacent one of the outward panels at locations on opposite sides of the vertex edge and between opposing transverse frame members.

16. A vehicle sub-frame structure according to claim 15, wherein the first longitudinal support beam is affixed between a bottom one of the V-shaped panels and the bottom outward panel, and the second and third longitudinal support beams are affixed between a top one of the V-shaped panels and the top outward panel.

17. A truck according to claim 10, wherein the bracing members further comprise a plurality of support beams extending between the brace panels and the top and bottom outward panels.

18. A truck according to claim 10, wherein the longitudinal frame members and the bottom outward panel are integrally formed from a unitary sheet of metal.

\* \* \* \* \*